(12) United States Patent
Patel et al.

(10) Patent No.: US 11,546,379 B2
(45) Date of Patent: Jan. 3, 2023

(54) PROVIDING SECURITY FOR INTERNET OF THINGS (IOT) DEVICES

(71) Applicant: Hewlett Packard Enterprise Development LP, Houston, TX (US)

(72) Inventors: Ramlakhan Patel, Bangalore (IN); Ankit Kumar Sinha, Bangalore (IN); Praveen Kumar Arora, Bangalore Karnataka (IN); Rangaprasad Sampath, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 257 days.

(21) Appl. No.: 15/884,724

(22) Filed: Jan. 31, 2018

(65) Prior Publication Data

US 2018/0219920 A1 Aug. 2, 2018

(30) Foreign Application Priority Data

Jan. 31, 2017 (IN) .............................. 201741003615

(51) Int. Cl.
*H04L 9/40* (2022.01)
*H04L 67/12* (2022.01)
*H04L 69/325* (2022.01)
*H04L 47/32* (2022.01)
(Continued)

(52) U.S. Cl.
CPC .......... *H04L 63/20* (2013.01); *H04L 63/0876* (2013.01); *H04L 63/10* (2013.01); *H04L 63/102* (2013.01); *H04L 63/164* (2013.01); *H04L 67/12* (2013.01); *G06N 20/00* (2019.01); *H04L 12/4641* (2013.01); *H04L 47/32* (2013.01);
(Continued)

(58) Field of Classification Search
CPC . H04L 12/4641; H04L 47/32; H04L 63/0876; H04L 63/10; H04L 63/1441; H04L 63/164; H04L 63/20; H04L 67/12; H04L 69/325; H04L 63/102; G06N 20/00
See application file for complete search history.

(56) References Cited

U.S. PATENT DOCUMENTS 8,341,396 B1 * 12/2012 Nick-Baustert ....... H04L 51/063
713/153
9,432,378 B1 8/2016 Svigais
(Continued)

OTHER PUBLICATIONS

"Authentication & Secure IoT," STMicoelectronics, 2015, 2 Pgs.
(Continued)

*Primary Examiner* — Trang T Doan
(74) *Attorney, Agent, or Firm* — Hewlett Packard Enterprise Patent Department

(57) ABSTRACT

Examples provided herein describe a method for providing security for Internet of Things (IoT) devices. For example, a data packet from an IoT device may be received at an edge device. A signature associated with the IoT device may be accessed at the edge device, where the signature includes network layer information about the IoT device. A set of rules may be applied by the edge device to validate the IoT device based on the accessed signature. Responsive to the IoT device being validated based on the accessed signature, received data packet, and the applied set of rules, the edge device may process the data packet from the IoT device.

19 Claims, 5 Drawing Sheets

510 ACCESS, AT THE EDGE DEVICE, THE SIGNATURE ASSOCIATED WITH THE IOT DEVICE

511 DETERMINE WHETHER THE SIGNATURE ASSOCIATED WITH THE IOT DEVICE EXISTS

512 VALIDATE THE DATA PACKET USING ALL FIELDS RESPONSIVE TO DETERMINING THAT THE SIGNATURE DOES NOT EXIST

(51) Int. Cl.
*H04L 12/46* (2006.01)
*G06N 20/00* (2019.01)

(52) U.S. Cl.
CPC ........ *H04L 63/1441* (2013.01); *H04L 69/325* (2013.01)

(56) References Cited

U.S. PATENT DOCUMENTS

| | | | | |
|---|---|---|---|---|
| 2006/0104268 | A1* | 5/2006 | Lee | H04L 45/00 370/389 |
| 2014/0119231 | A1* | 5/2014 | Chan | H04L 69/22 370/253 |
| 2015/0127342 | A1* | 5/2015 | Sharifi | G10L 17/18 704/239 |
| 2015/0229654 | A1 | 8/2015 | Perier | |
| 2016/0212099 | A1 | 7/2016 | Zou et al. | |
| 2016/0248746 | A1* | 8/2016 | James | H04L 67/12 |
| 2016/0301707 | A1* | 10/2016 | Cheng | H04L 67/12 |
| 2016/0323257 | A1 | 11/2016 | Kang et al. | |
| 2016/0366186 | A1* | 12/2016 | Kamble | H04L 63/1433 |
| 2016/0381030 | A1* | 12/2016 | Chillappa | H04W 4/38 726/11 |
| 2017/0063566 | A1* | 3/2017 | Seminario | H04L 67/12 |
| 2017/0201585 | A1* | 7/2017 | Doraiswamy | H04L 67/10 |
| 2017/0236188 | A1* | 8/2017 | Puck | G06Q 30/0635 705/26.81 |
| 2017/0302663 | A1* | 10/2017 | Nainar | H04L 9/3247 |
| 2017/0331672 | A1* | 11/2017 | Fedyk | H04L 41/40 |
| 2017/0353859 | A1* | 12/2017 | Idnani | H04W 12/08 |
| 2017/0359237 | A1* | 12/2017 | Hao | G06F 21/44 |
| 2018/0092151 | A1* | 3/2018 | Liu | H04W 24/02 |
| 2018/0191756 | A1* | 7/2018 | Kaushik | H04L 63/145 |
| 2018/0295101 | A1* | 10/2018 | Gehrmann | H04L 63/1441 |

OTHER PUBLICATIONS

"Security Challenges in the Internet of Things (IoT)", available online at <http://resources.infosecinstitute.com/security-challenges-in-the-internet-of-things-iot/>, Nov. 30, 2015, 20 pages.

Communications Service Providers, "Communications Service Providers", available online at <https://web.archive.org/web/20160719083028/http://h41111.www4.hp.com/csp/solutions/index.html>, Jul. 19, 2016, 4 pages.

Dr. Tom Bradicich, "HPE Discover 2015 London", available online at < https://www.youtube.com/watch?v=zU64RNIsKxw>, Dec. 3, 2015, 3 pages.

HPE Universal IoT Platform, "Solutions for Communications Service Providers and Enterprise customers", available online at <https://web.archive.org/web/20160516220655/http://h41111.www4.hp.com/solutions/iot/index.html>, May 16, 2016, 5 pages.

Jaikumar Vijayan, Computerworld "Target attack shows danger of remotely accessible HVAC systems", Feb. 7, 2014, available at <http://www.computerworld.com/article/2487452/cybercrime-hacking/target-attack-shows-danger-of-remotely-accessiblehvac-systems.html> 6 pages.

Postscapes Logo Postscapes, "IOT Standards and Protocols", available online at <https://web.archive.org/web/20170927052742/https://www.postscapes.com/internet-of-things-protocols/>, Sep. 27, 2017, 20 pages.

\* cited by examiner

PROVIDING SECURITY FOR INTERNET OF THINGS (IOT) DEVICES

BACKGROUND

As networks become stronger and have broader coverage, the use of Internet of Things ("IoT") devices have increased. Low end IoT devices (e.g., IoT enabled traffic signals, temperature sensors, e-LED bulbs, etc.) are often deployed in public and open places without complex hardware.

BRIEF DESCRIPTION OF THE DRAWINGS

The following detailed description references the drawings, wherein.

DETAILED DESCRIPTION

Figure 1:
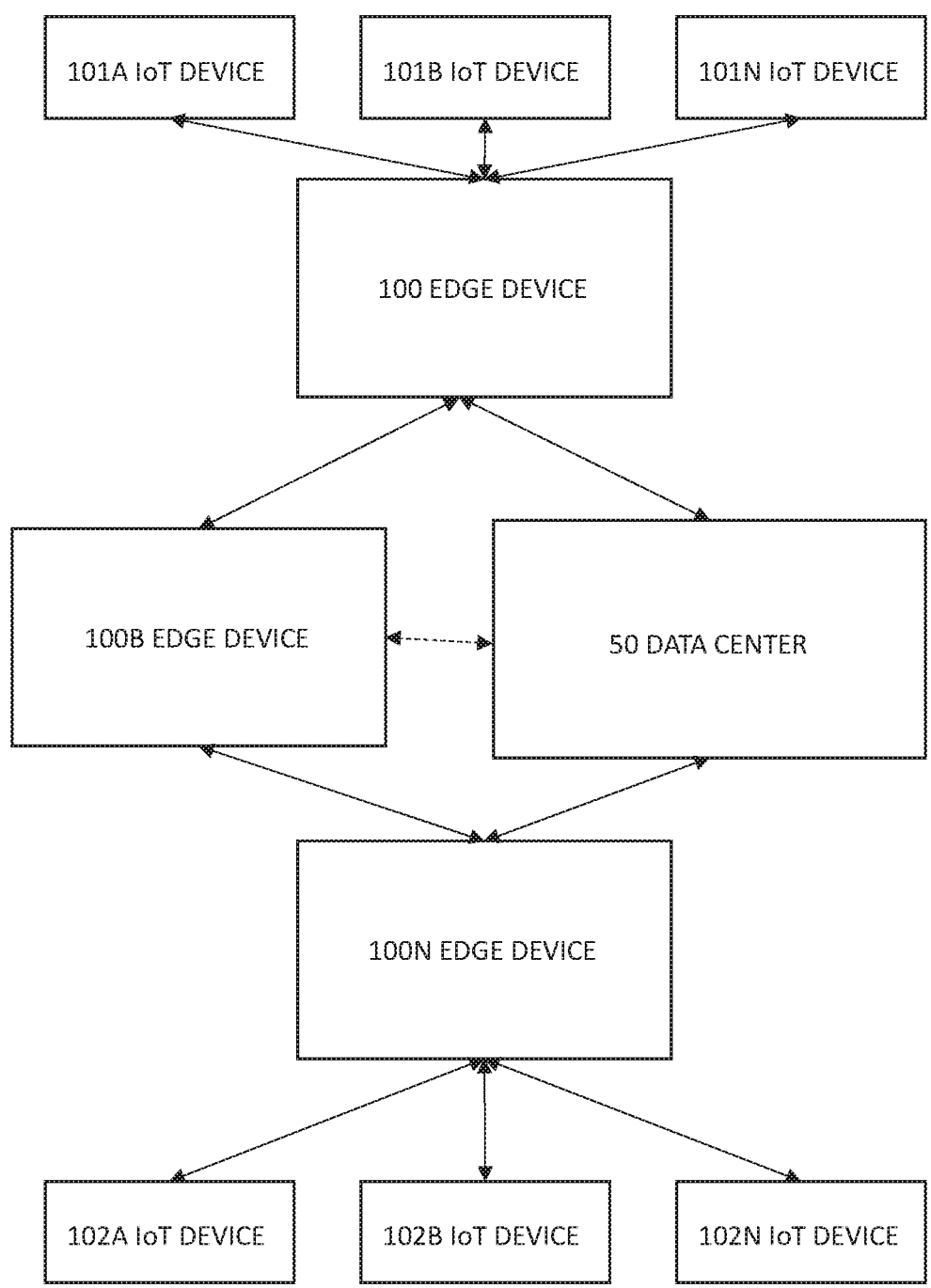
FIG. 1 is a block diagram depicting an example environment in which various examples may be implemented as a system that provides security for IoT devices.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The foregoing disclosure describes a number of example implementations for providing security for Internet of Things ("IoT") devices. The disclosed examples may include systems, devices, computer-readable storage media, and methods for providing security for IoT devices. For purposes of explanation, certain examples are described with reference to the components illustrated in FIGS. 1-6. The functionality of the illustrated components may overlap, however, and may be present in a fewer or greater number of elements and components.

Figure 3:
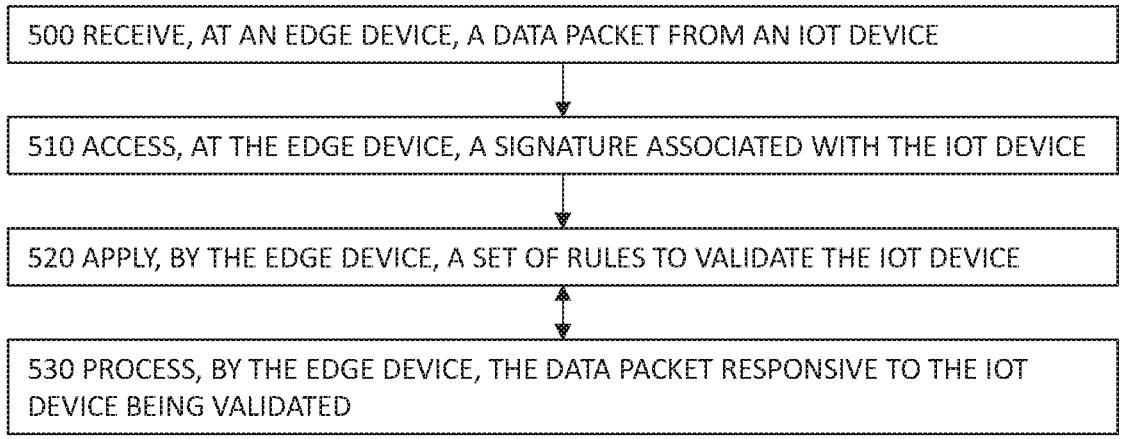
FIG. 3 is a flow diagram depicting an example method for providing security for IoT devices.
Figure 4:
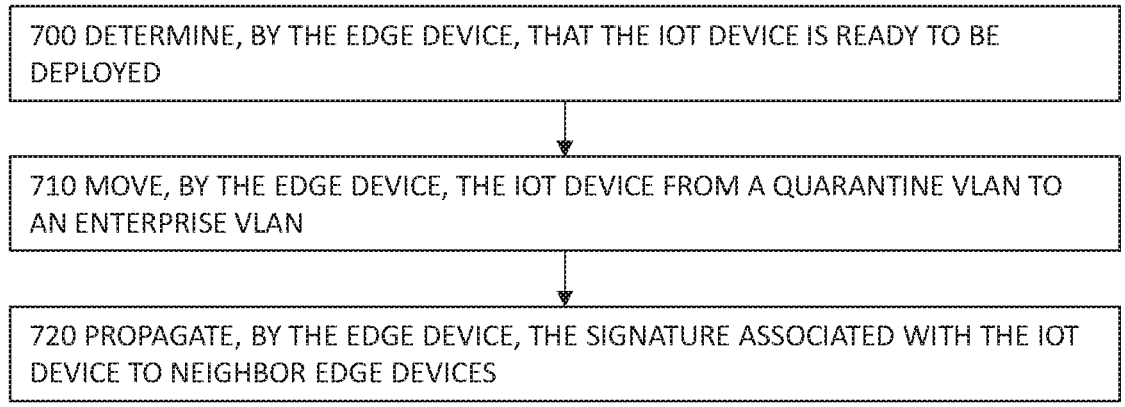
FIG. 4 is a flow diagram depicting an example method for providing security for IoT devices.
Figure 4A:
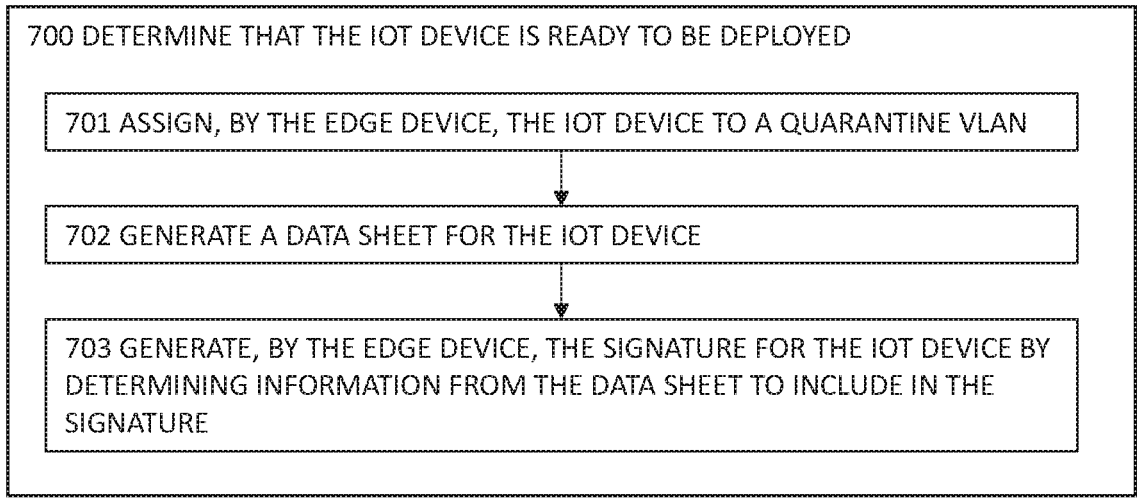
FIG. 4A is a flow diagram depicting an example method for providing security for IoT devices.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 3-4A are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

As networks become stronger and have broader coverage, the use of Internet of Things ("IoT") devices have increased. Low end IoT devices (e.g., IoT enabled traffic signals, temperature sensors, e-LED bulbs, etc.) are often deployed in public and open places without complex hardware. These low end IoT devices suffer from having multiple points of vulnerability and quality discrepancy across, both of which may serve to facilitate and propagate attacks.

In order to fully protect an IoT device (and the networks and data centers connected to it), the product, embedded software, data inside the device, communication channels, data aggregation platforms, and data centers that manage the data may also need to be protected. As such, these multiple points of vulnerability allow for numerous points of potential attack.

The discrepancy in quality between IoT devices may aggravate this security issue. Each IoT device in a network may have different hardware and security capabilities. A security vulnerability in one device may be used to facilitate attacks on downstream devices in a network. For example, credentials appropriated from a weakened IoT device may be used to break more secure systems or access information on other IoT devices in the network.

To exacerbate this issue, an owner of an IoT device may not even know the device has been compromised without dumping memory, analyzing firmware, monitoring network traffic to and from the device, or taking another costly measure to analyze the device's security.

Numerous issues exist with current IoT device security and protection. In some examples, the IoT device may include an integrated security module that verifies that data transmitted back and forth has not been improperly manipulated, but then the IoT device is then no longer a low end, inexpensive IoT device that can be widely deployed. These sophisticated devices with integrated security modules still also face their own security vulnerabilities. Other solutions require hardware such as intelligence chips or complex and costly solutions like deep packet inspection, server authentication, and so forth.

Examples discussed herein address these technological issues by providing security for low end IoT devices that are deployed at public and open places. In particular, security is provided by automatically detecting IoT device packet formation, managing IoT device signatures, and monitoring for suspicious activity, where the low end IoT devices usually connected to an edge switch or Wi-Fi access point (AP).

In some examples, a technical solution that provides security for IoT devices may include receiving, at an edge device in a network, a data packet from an IoT device. A signature associated with the IoT device may be accessed at the edge device, where the signature includes network layer information about the IoT device. The edge device may apply a set of rules to validate the IoT device based on the accessed signature. Responsive to the IoT device being validated based on the accessed signature, received data packet, and the applied set of rules, the edge device may process the data packet from the IoT device.

In particular, before an IoT device is deployed on an enterprise network, an edge device connected to the IoT device may assign the IoT device to a guest virtual LAN (ULAN). In some examples, the IoT device may be assigned to a local area network (LAN) or a ULAN. The edge device may parse data received from the IoT device to create a packet layout. In some examples, a common packet layout for all IoT devices may be pre-generated based on information from a control packet of the IoT device. The information from the control packet may include information from the L3 and L4 layers of network information associated with the IoT device (e.g., Ethernet and TCP/UDP layer information), from the L2 to L7 layers of information from the control packet, from information from the application layer from the control packet, and/or any combination thereof.

The edge device may then determine a data sheet for the IoT device from this information and from information about the IoT device itself. The data sheet may include, for example, information about the protocol used by the IoT device, packet size, device type, packet layout fields, a predefined role for the IoT device, and so forth.

The edge device may then create a data signature for the IoT device from the data sheet and may configure the IoT device on the edge device. As such, once the packet layout and data sheet are formed, fields from the packet layout may be selected to generate a device signature for the IoT device. In some examples, the edge device may use a signature configuration wizard to select these fields, where the wizard is optimized using machine learning to determine the optimal fields to select for the signature. In other examples, an admin may select fields or a predetermined set of fields may be used.

Once the signature is generated, the edge device may sync the signature of the IoT device in all other neighbor edge devices, which may be propagated across the network and data center, so the IoT device is authenticated across the network and data center using a single signature. If an edge device does not have a signature stored for an IoT device, it may authenticate the IoT device using at least one or a plurality of fields of the data sheet. In some examples, if the edge device does not have a signature stored for an IoT device, it may authenticate the IoT device using all of the fields of the data sheet.

Once the signature has been generated and propagated, the IoT device may be deployed by moving the IoT device from the guest VLAN to an enterprise VLAN (or from a guest LAN to an enterprise LAN as appropriate), and data packets of the IoT device may be validated based on comparing the signature of the IoT device and information from the packet headers. In some examples, the predefined role for the IoT device may be applied as it is moved to the enterprise VLAN.

In some examples, validation of the data packets of the IoT device may involve signature rules that may be applied at various time intervals. Signature rules may specify how the comparison between the signature of the IoT device and the information from the packet headers should be performed. For example, a series of rules may be applied to a data packet, to check, in sequence or in parallel, a MAC address, IP address, checksum, ACL list, etc. In another example, a signature rule may comprise a hardware rule that could not be validated by the packet or the IoT device that would need to be handled at an edge device or data center server. In this example, session information may also needed to be transmitted to facilitate handling of the rule. If an edge device is unable to parse a data packet from an IoT device, it may send the packet to a remote parser that may perform validation.

If validation fails because one or more of the series of rules applied to the data packet fails, the data packet may be dropped and/or an error message may be logged. In addition, an admin of the network or data center may be informed. In response, remediation may be performed (automatically based on the rule that failed or based on admin action). Remediation could include, for example, quarantining the IoT device, disabling the port used for communication, and/or other measures to prevent potential propagation of an attack.

FIG. 1 is an example environment in which various examples may be implemented as a system that provides security for IoT devices. In some examples, system that provides security for IoT devices may include various components such as a data center, a set of edge devices (e.g., edge devices 100, 100B, . . . , 100N, and a set of IoT devices 101A, 101B, . . . , 101N, 102A, 102B, . . . , 102N, and/or other IoT devices. Each edge device (e.g., edge device 100) may communicate to and/or receive data from a data center 50, a set of IoT devices (e.g., devices 101A, 101B, . . . , 101N), a set of other edge devices (e.g., edge devices 101B, . . . , 101N), and/or other components in a network. An edge device may comprise an access point, network switch, or other hardware device on a network that comprises a physical processor that implements machine readable instructions to facilitate communication in the network. Data center 50 may be any data center that stores data of the network. IoT devices 101A, 101B, . . . , 101N may be any IoT devices that are connected to the edge device. In some examples, IoT devices may be low-end devices that may be publicly deployed in a widespread manner. A low-end IoT device may comprise, for example, an IoT device that does not include complex hardware, separate security modules, or any specialized combination of hardware and programming that may facilitate analytical functionality by the IoT device. In some examples, the IoT devices may comprise one or multiple types of IoT devices on the network. Types of IoT devices may comprise, for example, traffic signals, coffee makers, air quality sensors, thermostats, printers, lightbulbs, and/or any other IoT device.

According to various implementations, a system that provides security for IoT devices and the various components described herein may be implemented in hardware and/or a combination of hardware and programming that configures hardware. Furthermore, in FIG. 1 and other Figures described herein, different numbers of components or entities than depicted may be used. In some examples, a system that provides security for IoT devices may comprise a set of edge devices, with at least one edge device being connected to an IoT device.

Figure 1A:
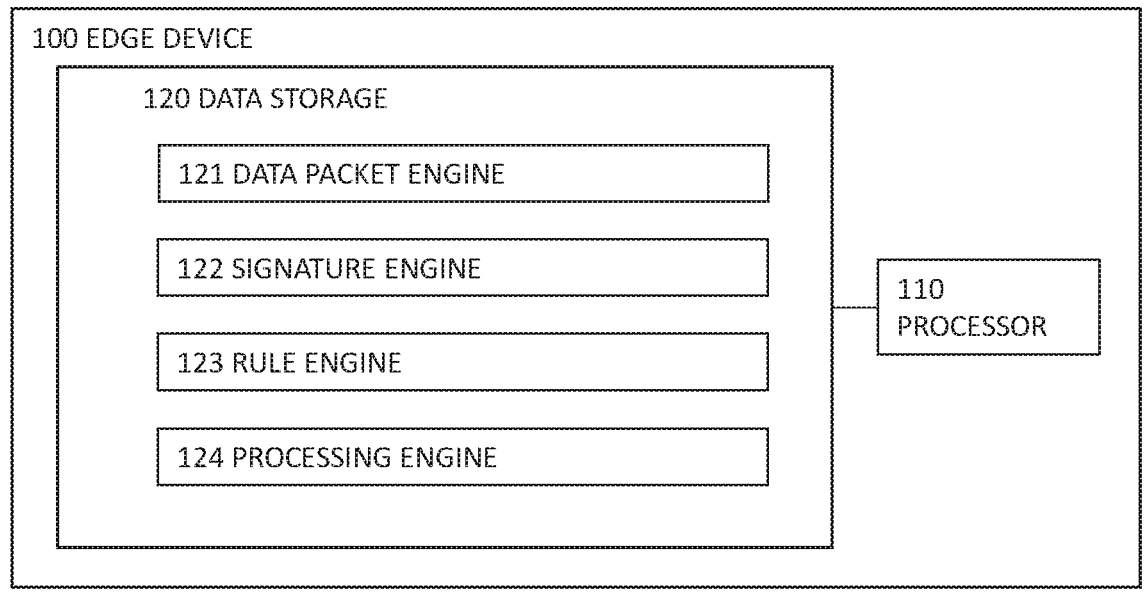
FIG. 1A is a block diagram depicting an example edge device for providing security for IoT devices.

FIG. 1A is a block diagram depicting an example edge device for providing security for IoT devices. In some examples, the example edge device 100 may comprise the edge device 100 of FIG. 1. Edge device, which provides security for IoT devices 101A, 101B, . . . , 101N, may comprise a physical processor 110, a data packet engine 121, a signature engine 122, a rule engine 123, a processing engine 124, and/or other engines. The term "engine", as used herein, refers to a combination of hardware and programming that performs a designated function. As is illustrated with respect to FIGS. 3-4, the hardware of each engine, for example, may include one or both of a physical processor and a machine-readable storage medium, while the programming is instructions or code stored on the machine-readable storage medium and executable by the processor to perform the designated function.

Data packet engine 121 may facilitate deployment of an IoT device on an enterprise VLAN and may also facilitate communication of data packets between an IoT device and the edge device 100 via the enterprise ULAN. Each IoT device connected to edge device 100 may be intended to perform a specific function and use a particular communication protocol to send and receive control data from the IoT device to the edge device 100.

In some examples, data packet engine 121 may determine that an IoT device is ready to be deployed on an enterprise VLAN to which the edge device 100 is connected. The data packet engine 121 may determine the IoT device is ready to be deployed responsive to receiving an instruction from a data center, another edge device in the network, and/or other entity in the network to deploy the IoT device. In order to deploy the IoT device, the data packet engine 121 may assign the IoT device to a quarantine or guest VLAN. The quarantine or guest VLAN may comprise a VLAN that is separate from the enterprise VLAN and that may only be accessible to edge device 100.

As part of the deployment process (and/or as an initiator to the deployment process), the data packet engine 121 may receive data from the IoT device. The data received from the IoT device may comprise a set of control packets, information about the physical and logical structure of the IoT device, and/or other information about the IoT device. The data packet engine 121 may parse the data received from the IoT device to create a packet layout. In some examples, the data received from the IoT device may comprise information in a common packet layout that may be pre-generated with network layer information associated with the IoT device. For example, the network layer information may comprise metadata information from control packets received from the IoT device from the Ethernet frame layer to an L4 layer on a network stack. In some examples, the common packet layout may be generated in a format used for known IoT device datagrams, such as XML, JSON, TLV, and/or another packet layout format.

The data packet engine 121 may use the data parsed from the IoT device to generate a data sheet for the IoT device. In some examples, a master layout may be used for the data sheet, and the data packet engine 121 may extrapolate a set of data from the parsed data to fill the information in the master layout for the IoT device. In some examples, the master layout may be machine-learned, may be received from an administrator of the system, may be received from a data center or other edge device connected to edge device 100, and/or may be otherwise determined. The data packet engine 121 may generate the data sheet using the master layout such that the data sheet for the IoT device may comprise all available information about the IoT device or may comprise at least a key subset of information about the IoT device. The key subset of information may comprise, for example, an identifier of the IoT device, at least a protocol used by the IoT device, packet size of packets communicated to and from the IoT device, a type of the device, network information about the IoT device (e.g., information about the L3 and L4 network layers for the IoT device), and/or other information about the IoT device.

Responsive to generating the data sheet based at least on information from a control packet received from the IoT device and information about the IoT device, the data packet engine 121 may generate a signature for the IoT device. The data packet engine 121 may generate the signature for the IoT device by listing the IoT device as a connected IoT device in an edge device signature configuration wizard. The wizard comprises a combination of hardware and programming of the edge device and may select fields from the data sheet to include in the signature. In some examples, the wizard may be optimized by machine learning to determine an optimal set of fields from the data sheet to include in the signature. In other examples, the information included in the signature may comprise some or all of the information from the data sheet and may be determined by an administrator of the system, may be received from a data center or other edge device in the network, and/or may be otherwise determined. Responsive to determining the information to include from the data sheet, the data packet engine 121 may generate the signature for the IoT device. The signature may have a predetermined format, such that edge devices in the network may parse a signature and/or compare information to and from a signature in a similar manner.

Responsive to the data packet engine 121 generating the signature, the data packet engine 121 may determine that the IoT device is ready to be deployed. As such, the data packet engine 121 may facilitate the moving of the IoT device from operating on the quarantine VLAN to the enterprise VLAN that connects the edge device 100 to the rest of the network (e.g., to other IoT devices, other edge devices, a data center, and/or other entities connected via the enterprise VLAN). The data packet engine 121 may also enforce policies regarding the IoT device, such as ingress/egress bandwidth, Power-Over Ethernet (POE), access control lists (ACL), and/or other policies related to performance of the IoT device.

The data packet engine 121 may also propagate the signature associated with the IoT devices to its neighbor edge devices. For example, the data packet engine 121 may sync the signature of the IoT device to all other neighbor devices using rsync, RFS, socket communication, and/or another communication type. In a similar manner, upon receiving a signature from another edge device, data packet engine 121 may determine whether it already stores that signature, may store the signature (if it has not yet been stored), and may propagate the signature to its neighbor devices. As such, data packet engine 121 may facilitate deployment of IoT devices on its enterprise VLAN.

Data packet engine 121 may also facilitate communication between IoT devices and the edge device 100. Data packet engine 121 may receive a data packet from an IoT device. The data packet engine 121 may receive the data packet via an enterprise VLAN over which the edge device 100 and the IoT device are connected. In some examples, the data packet engine 121 may receive data packets from each IoT device to which it is connected. For example, for some or all of the IoT devices connected to the edge device 100, data packet engine 121 may receive data packets at predetermined time intervals, at random intervals, at a predefined set of intervals, and/or any combination thereof. As such, for a first IoT device (e.g., 101N), data packet engine 121 may receive a first data packet at a first time interval and a second data packet at a second time interval an amount of time after the first time interval. In some examples, the data packet received by the data packet engine 121 may comprise a packet header and a layout that comprises the data intended to be communicated from the IoT device to the edge device 100.

Responsive to the data packet engine 121 receiving a data packet from an IoT device, signature engine 122 may access a signature associated with the IoT device. The signature engine 122 may access the signature associated with the IoT device from a payload of the data packet received from the IoT device, may determine the signature associated with the IoT device from the data packet based on information from the data packet, and/or may otherwise access the signature. The signature engine 122 may then determine whether the accessed signature matches a signature stored in a non-transitory storage medium communicably coupled to edge device 100. Responsive to determining that a matching signature does not exist in the storage medium, the signature engine 122 may validate the data packet using some or all fields of the data packet. In an example in which the signature engine 122 is unable to parse the data packet to determine a signature, the signature engine 122 may send the received data packet to a remote parser via the enterprise VLAN and may receive an indication from the remote parser as to whether the data packet is validated to have been received from the IoT device or not.

Rule engine 123 may apply a set of rules to validate the IoT device based on the accessed signature. The rule engine 123 may determine the set of rules to apply to validate the IoT device based upon the determined set of rules associated with the signature. Each signature may indicate a set of rules and/or an order of application of the rules associated therewith. The set of rules and/or order may be received from an administrator of the system, from a data center server or other edge device connected via the enterprise VLAN, may be received along with the signature propagated for the IoT device during its deployment, and/or may be otherwise determined. The set of rules may comprise a single rule or multiple rules, may comprise rules that check hardware or software, may be checked in parallel or sequentially, and/or may otherwise be applied. In some examples, a rule may comprise, for example, a check of a MAC address, a check of an IP address, a verification of a checksum, a verification of an ACL list from the IoT device, and/or any other rule that could be used to validate the IoT device. For example, for a particular rule, a verification or check of data may comprise determining whether the data matches corresponding information in the data packet received from the IoT device.

In some examples, an accessed signature may be associated with multiple sets of rules that may be applied to a data packet from the associated IoT device based on various parameters. These parameters may comprise time parameters, information included in the data packet received, a context or state of the edge device and/or the IoT device, and/or other constraints. For example, the rule engine 123 may select that a particular set of rules associated with the accessed signature based on the data packet being received with a certain time parameter (e.g., a time of day, a set of dates, and/or other time parameter). In some examples, the rule engine 123 may determine the particular set of rules to apply based on a best match of parameters associated with a set of rules being met and/or based on another determination that considers the parameters associated with the multiple rule sets.

In some examples, the set of rules may comprise a rule that may be unable to be validated by the edge device. In these examples, the rule engine 123 may send the appropriate information (e.g., the rule, the received data packet, the accessed signature, and/or other information) to an entity that is able to apply the particular rule. Examples of rules that may not be validated by the edge device may comprise rules that require information other than information from the received data packet and accessed signature, a hardware rule that may require a check of the IoT device, and/or other rules that may not be validated by the edge device 100.

Rule engine 123 may apply the determined set of rules to the data packet and determine whether the data packet is validated as being received from the IoT device, and/or that the IoT device has not been compromised by a security breach.

Responsive to rule engine 123 validating the data packet received from the IoT device, processing engine 124 may process the data packet from the IoT device. Responsive to the data packet not being validated by the rule engine 123, processing engine 124 may drop the data packet. In some examples, responsive to the data packet not being validated, processing engine 124 may also perform remediation. The processing engine 124 may perform remediation by determining a first remediation of a set of available remediations to perform. In some examples, the processing engine 124 may determine the remediation to perform based on determining which signature rule of the set of rules applied failed during validation. In other examples, processing engine 124 may determine the remediation to perform based on a subset of remediations associated with the accessed signature rule. Remediations may include, for example informing the administrator of the system, disabling the port by which the data packet was received, quarantining the IoT device, and/or other actions to prevent a potential security threat at the IoT device from propagating through the devices connected thereto via the enterprise VLAN.

In performing their respective functions, engines 121-124 may access data storage 120 and/or other suitable database(s). Data storage 120 may represent any memory accessible to the edge device 100 that can be used to store and retrieve data. Data storage 120 and/or other databases communicably coupled to the edge device may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. The edge device 100 that provides security for IoT devices may access data storage 120 locally or remotely via a network.

Data storage 120 may include a database to organize and store data. The database may reside in a single or multiple physical device(s) and in a single or multiple physical location(s). The database may store a plurality of types of data and/or files and associated data or file description, administrative information, or any other data.

Figure 1B:
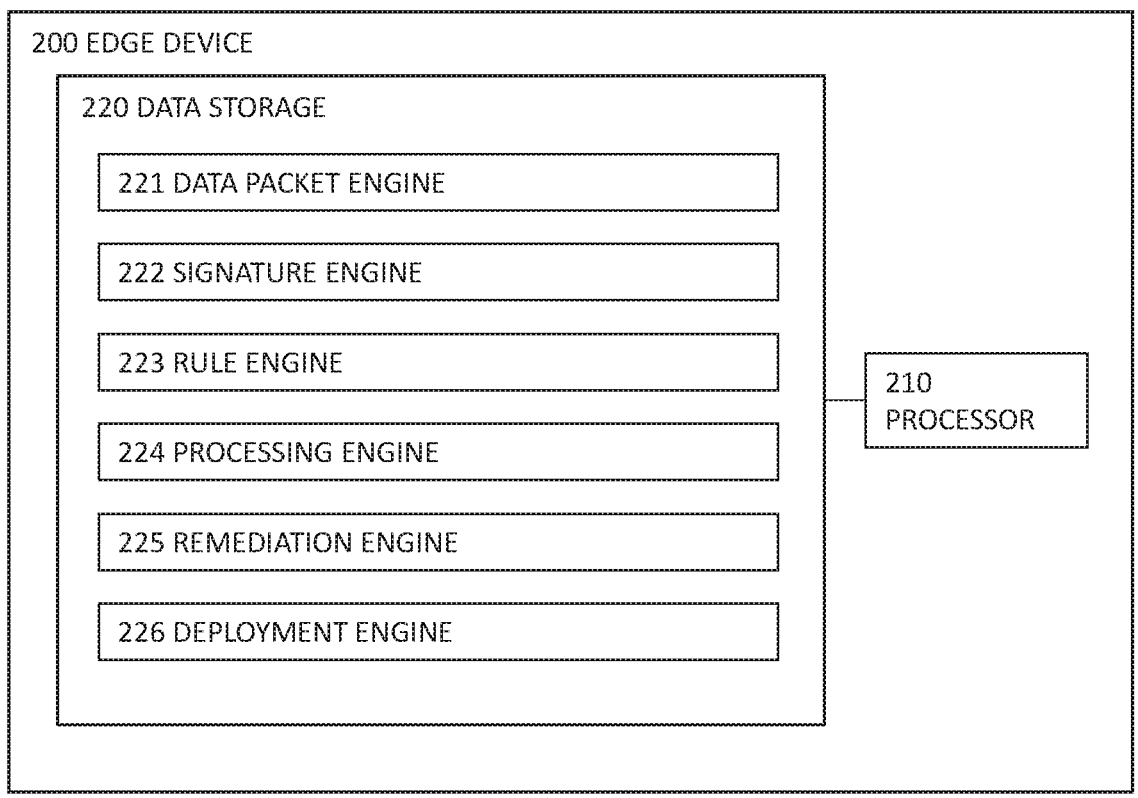
FIG. 1B is a block diagram depicting an example edge device for providing security for IoT devices.

FIG. 1B is a block diagram depicting an example edge device 200 that provides security for IoT devices. In some examples, example edge device 200 may comprise edge device 100 of FIG. 1. Edge device 200, which may provide security for IoT devices (e.g., devices 101A, 101B, . . . , 101N) may comprise a physical processor 210, data packet engine 221, a signature engine 222, a rule engine 223, a processing engine 224, a remediation engine 225, a deployment engine 226, and/or other engines. Engines 221-226 represent engines 121-124, respectively.

Figure 2A:
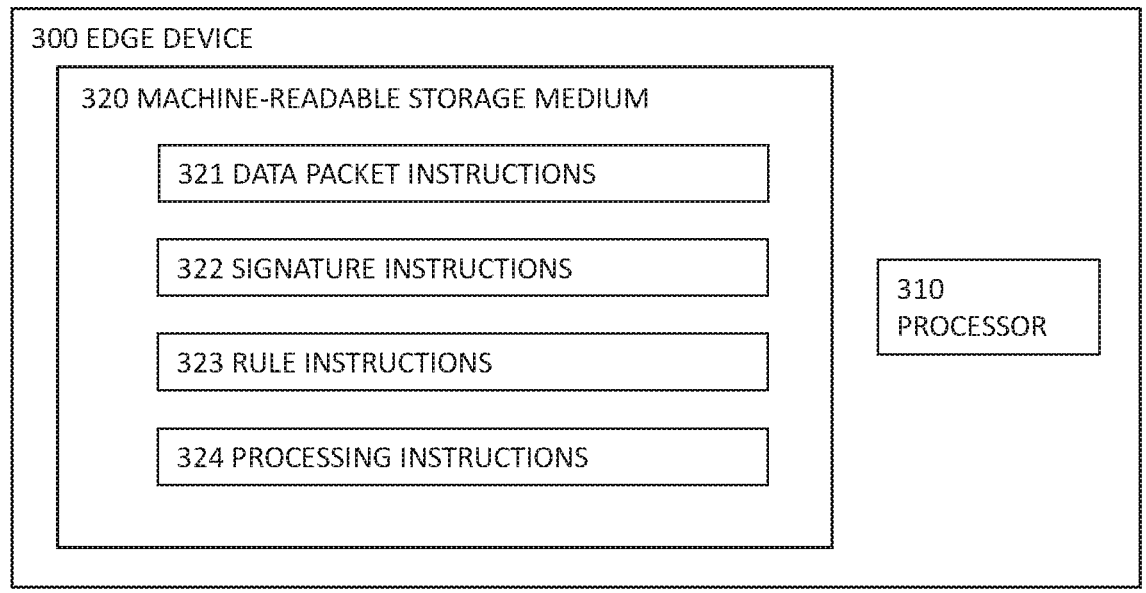
FIG. 2A is a block diagram depicting an example machine-readable storage medium comprising instructions executable by a processor for providing security for IoT devices.

FIG. 2A is a block diagram depicting an example machine-readable storage medium 310 comprising instructions executable by a processor for providing security for IoT devices.

In the foregoing discussion, engines 121-124 were described as combinations of hardware and programming. Engines 121-124 may be implemented in a number of fashions. Referring to FIG. 2A, the programming may be processor executable instructions 321-324 stored on a machine-readable storage medium 310 and the hardware may include a processor 311 for executing those instructions. Thus, machine-readable storage medium 310 can be said to store program instructions or code that when executed by processor 311 implements an edge device that provides security for IoT devices of FIG. 1.

In FIG. 2A, the executable program instructions in machine-readable storage medium 310 are depicted as data packet instructions 321, signature instructions 322, rule instructions 323, and processing instructions 324. Instructions 321-324 represent program instructions that, when executed, cause processor 311 to implement engines 121-124, respectively.

Figure 2B:
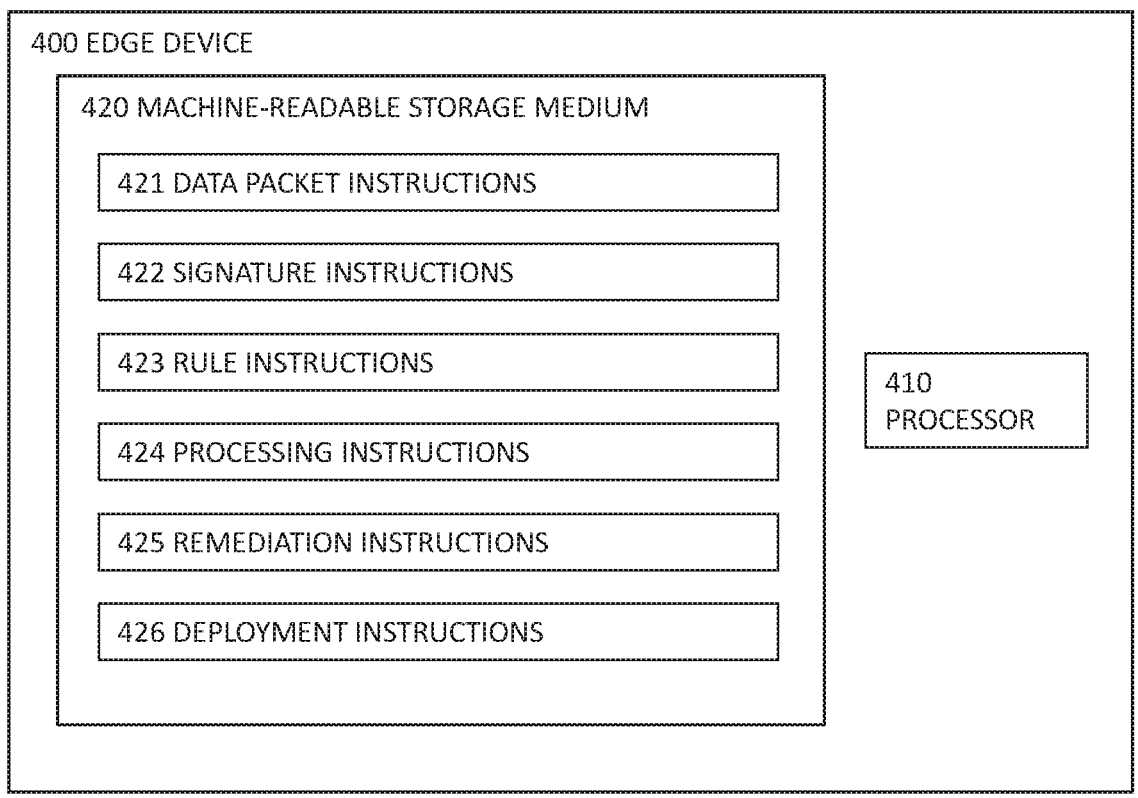
FIG. 2B is a block diagram depicting an example machine-readable storage medium comprising instructions executable by a processor for providing security for IoT devices.

FIG. 2B is a block diagram depicting an example machine-readable storage medium 420 comprising instructions executable by a processor for providing security for IoT devices.

In the foregoing discussion, engines 221-226 were described as combinations of hardware and programming. Engines 221-226 may be implemented in a number of fashions. Referring to FIG. 2B, the programming may be processor executable instructions 421-426 stored on a machine-readable storage medium 420 and the hardware may include a processor 410 for executing those instructions. Thus, machine-readable storage medium 420 can be said to store program instructions or code that when executed by processor 410 implements an edge device that provides security for IoT devices of FIG. 2B.

In FIG. 2B, the executable program instructions in machine-readable storage medium 410 are depicted as data packet instructions 421, signature instructions 422, rule instructions 423, processing instructions 424, remediation instructions 426, deployment instructions 426, and/or other instructions. Instructions 421-426 represent program instructions that, when executed, cause processor 410 to implement engines 221-226, respectively.

Machine-readable storage medium 320 (or machine-readable storage medium 420) may be any electronic, magnetic, optical, or other physical storage device that contains or stores executable instructions. In some implementations, machine-readable storage medium 320 (or machine-readable storage medium 420) may be a non-transitory storage medium, where the term "non-transitory" does not encompass transitory propagating signals. Machine-readable storage medium 320 (or machine-readable storage medium 420) may be implemented in a single device or distributed across devices. Likewise, processor 310 (or processor 410) may represent any number of physical processors capable of executing instructions stored by machine-readable storage medium 320 (or machine-readable storage medium 420). Processor 310 (or processor 410) may be integrated in a single device or distributed across devices. Further, machine-readable storage medium 320 (or machine-readable storage medium 420) may be fully or partially integrated in the same device as processor 310 (or processor 410), or it may be separate but accessible to that device and processor 310 (or processor 410).

In one example, the program instructions may be part of an installation package that when installed can be executed by processor 310 (or processor 410) to implement an edge device that provides security for IoT devices. In this case, machine-readable storage medium 320 (or machine-readable storage medium 420) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 320 (or machine-readable storage medium 420) may include a hard disk, optical disk, tapes, solid state drives, RAM, ROM, EEPROM, or the like.

Processor 310 may be at least one central processing unit (CPU), microprocessor, and/or other hardware device suitable for retrieval and execution of instructions stored in machine-readable storage medium 320. Processor 310 may fetch, decode, and execute program instructions 321-324, and/or other instructions. As an alternative or in addition to retrieving and executing instructions, processor 310 may include at least one electronic circuit comprising a number of electronic components for performing the functionality of at least one of instructions 321-324, and/or other instructions.

Processor 410 may be at least one central processing unit (CPU), microprocessor, and/or other hardware device suitable for retrieval and execution of instructions stored in machine-readable storage medium 420. Processor 410 may fetch, decode, and execute program instructions 421-426, and/or other instructions. As an alternative or in addition to retrieving and executing instructions, processor 410 may include at least one electronic circuit comprising a number of electronic components for performing the functionality of at least one of instructions 421-426, and/or other instructions.

FIG. 3 is a flow diagram depicting an example method 500 for providing security for IoT devices. The various processing blocks and/or data flows depicted in FIG. 3 (and in the other drawing figures such as FIGS. 3A, 3B, 4, and 4A) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, the method of FIG. 3 as illustrated (and described in greater detail below) is meant be an example and, as such, should not be viewed as limiting. The method of FIG. 3 may be implemented in the form of executable instructions stored on a machine-readable storage medium, such as storage medium 420, and/or in the form of electronic circuitry.

In an operation 500, a data packet from an IoT device may be received at an edge device in a network. For example, the edge device 100 (and/or the data packet engine 121, the data packet instructions 321, or other resource of the edge device 100) may receive the data packet from the IoT device. The edge device 100 may receive the data packet from the IoT device in a manner similar or the same as that described above in relation to the execution of the data packet engine 121, the data packet instructions 321, and/or other resource of the edge device 100.

In an operation 510, a signature associated with the IoT device may be accessed, where the signature includes network layer information about the IoT device. For example, the edge device 100 (and/or the signature engine 122, the signature instructions 322 or other resource of the edge device 100) may access the signature associated with the IoT device. The edge device 100 may access the signature associated with the IoT device relative to the initial 3D scene in a manner similar or the same as that described above in relation to the execution of the signature engine 122, the signature instructions 322, and/or other resource of the edge device 100.

Figure 3A:
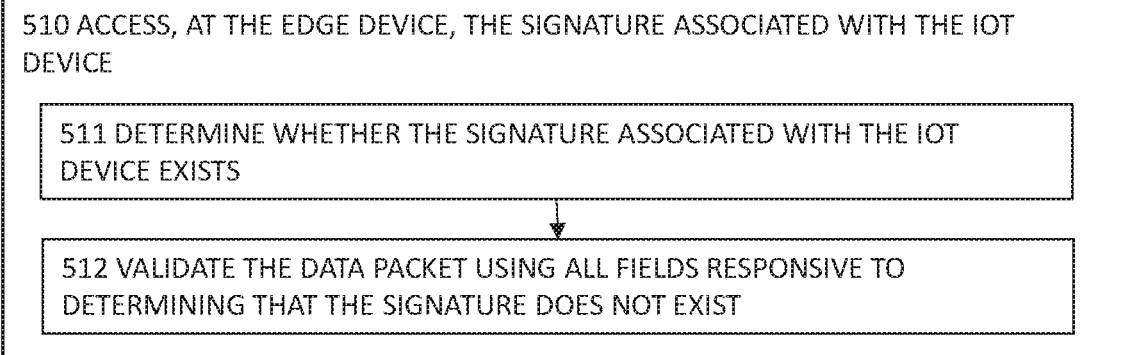
FIG. 3A is a flow diagram depicting an example method for providing security for IoT devices.
Figure 3B:
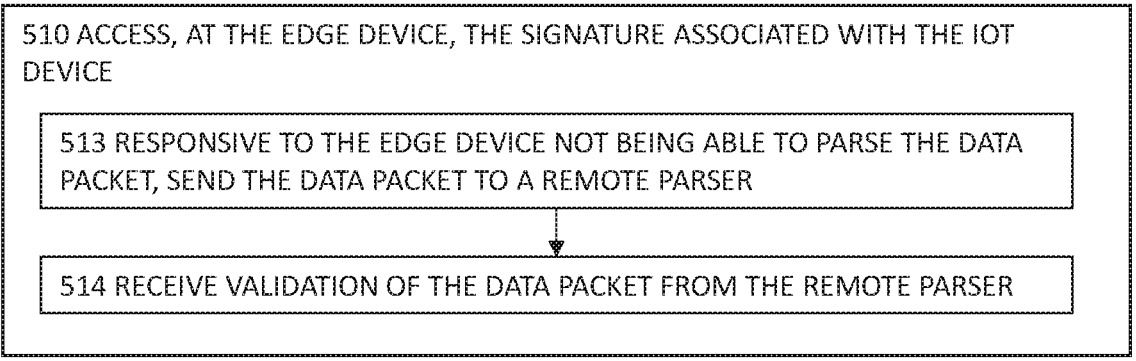
FIG. 3B is a flow diagram depicting an example method for providing security for IoT devices.

In some examples, the accessing of the signature associated with the IoT device may be done in several manners. FIGS. 3A and 3B are flow diagrams depicting an example method for providing security for IoT devices.

In particular, FIG. 3A shows an example of how to access the signature associated with the IoT device (as discussed above with respect to operation 510). The method of FIG. 3A as illustrated (and described in greater detail below) is meant to be an example and, as such, should not be viewed as limiting. The method of FIG. 3A may be implemented in the form of executable instructions stored on a machine-readable storage medium, such as storage medium 320, and/or in the form of electronic circuitry.

In an operation 511, a determination may be made as to whether the signature associated with the IoT device exists. For example, the edge device 100 (and/or the signature engine 122, the signature instructions 322 or other resource of the edge device 100) may determine whether the signature associated with the IoT device exists. The edge device 100 may determine whether the signature associated with the IoT device exists in a manner similar or the same as that described above in relation to the execution of the signature engine 122, the signature instructions 322, and/or other resource of the edge device 100.

In an operation 512, the data packet may be validated using all fields of the data packet responsive to determining that the signature does not exist. For example, the edge device 100 (and/or the signature engine 122, the signature instructions 322 or other resource of the edge device 100) may validate the data packet using all fields of the data packet responsive to determining that the signature does not exist. The edge device 100 may validate the data packet using all fields of the data packet responsive to determining that the signature does not exist in a manner similar or the same as that described above in relation to the execution of the signature engine 122, the signature instructions 322, and/or other resource of the edge device 100.

In another example, FIG. 3B shows an example of how to access the signature associated with the IoT device (as discussed above with respect to operation 510). The method of FIG. 3B as illustrated (and described in greater detail below) is meant to be an example and, as such, should not be viewed as limiting. The method of FIG. 3B may be implemented in the form of executable instructions stored on a machine-readable storage medium, such as storage medium 320, and/or in the form of electronic circuitry.

In an operation 513, the data packet may be sent to a remote parser responsive to the edge device not being able to parse the data packet. For example, the edge device 100 (and/or the signature engine 122, the signature instructions 322 or other resource of the edge device 100) may send the data packet to a remote parser responsive to the edge device not being able to parse the data packet. The edge device 100 may send the data packet to a remote parser responsive to the edge device not being able to parse the data packet in a manner similar or the same as that described above in relation to the execution of the signature engine 122, the signature instructions 322, and/or other resource of the edge device 100.

In an operation 514, validation of the data packet may be received from the remote parser. For example, the edge device 100 (and/or the signature engine 122, the signature instructions 322 or other resource of the edge device 100) may receive validation of the data packet from the remote parser. The edge device 100 may receive validation of the data packet from the remote parser in a manner similar or the same as that described above in relation to the execution of the signature engine 122, the signature instructions 322, and/or other resource of the edge device 100.

Returning to FIG. 3, in an operation 520, a set of rules may be applied to validate the IoT device based on the accessed signature. For example, the edge device 100 (and/or the rule engine 123, the rule instructions 323, or other resource of the edge device 100) may apply the set of rules to validate the IoT device based on the accessed signature. The edge device 100 may apply the set of rules to validate the IoT device based on the accessed signature in a manner similar or the same as that described above in relation to the execution of the rule engine 123, the rule instructions 323, and/or other resource of the edge device 100.

In an operation 530, responsive to the IoT device being validated based on the accessed signature, received data packet, and the applied set of rules, the data packet from the IoT device may be processed. For example, the edge device 100 (and/or the processing engine 124, the processing instructions 324, or other resource of the edge device 100) may process the data packet responsive to the IoT device being validated based on the accessed signature, received data packet, and the applied set of rules. The edge device 100 may process the data packet in a manner similar or the same as that described above in relation to the execution of the processing engine 124, the processing instructions 324, and/or other resource of the edge device 100.

FIG. 4 is a flow diagram depicting an example method for providing security for IoT devices. The method of FIG. 4 as illustrated (and described in greater detail below) is meant to be an example and, as such, should not be viewed as limiting. The method of FIG. 4 may be implemented in the form of executable instructions stored on a machine-readable storage medium, such as storage medium 420, and/or in the form of electronic circuitry.

In an operation 700, a determination may be made that the IoT device is ready to be deployed. For example, the system 200 (and/or deployment engine 226, the deployment instructions 426, or other resource of the system 200) may determine that the IoT device is ready to be deployed. The system 200 may determine that the IoT device is ready to be deployed in a manner similar or the same as that described above in relation to the execution of the deployment engine 226, the deployment instructions 426, and/or other resource of the system 200.

In some examples, the determination that the IoT device is ready to be deployed may be done in several manners. FIG. 4A is a flow diagram depicting an example method for providing security for IoT devices.

In particular, FIG. 4 shows an example of how to determine that the IoT device is ready to be deployed (as discussed above with respect to operation 700). The method of FIG. 4A as illustrated (and described in greater detail below) is meant to be an example and, as such, should not be viewed as limiting. The method of FIG. 4A may be implemented in the form of executable instructions stored on a machine-readable storage medium, such as storage medium 320, and/or in the form of electronic circuitry.

In an operation 700, the IoT device exists may be assigned to a quarantine VLAN. For example, the system 200 (and/or deployment engine 226, the deployment instructions 426, or other resource of the system 200) may assign the IoT device to the quarantine VLAN. The system 200 may assign the IoT device to the quarantine VLAN in a manner similar or the same as that described above in relation to the execution of the deployment engine 226, the deployment instructions 426, and/or other resource of the system 200.

In an operation 701, a data sheet may be generated for the IoT device based on information from a control packet of the IoT device and information about the IoT device, wherein the control packet includes the network information about the IoT device. For example, the system 200 (and/or deployment engine 226, the deployment instructions 426, or other resource of the system 200) may generate the data sheet. The system 200 may generate the data sheet in a manner similar or the same as that described above in relation to the execution of the deployment engine 226, the deployment instructions 426, and/or other resource of the system 200.

In an operation 702, the signature for the IoT device may be generated by determining information from the data sheet to include in the signature. For example, the system 200 (and/or deployment engine 226, the deployment instructions 426, or other resource of the system 200) may generate the signature for the IoT device. The system 200 may generate the signature for the IoT device in a manner similar or the same as that described above in relation to the execution of the deployment engine 226, the deployment instructions 426, and/or other resource of the system 200.

Returning to FIG. 4, responsive to determining that the IoT device is ready to be deployed, in an operation 700, the IoT device may be moved from a quarantine virtual local area network ("VLAN") to an enterprise VLAN. For example, the system 200 (and/or deployment engine 226, the deployment instructions 426, or other resource of the system 200) may move the IoT device from a quarantine virtual local area network ("VLAN") to an enterprise VLAN. The system 200 may move the IoT device from a quarantine virtual local area network ("VLAN") to an enterprise VLAN in a manner similar or the same as that described above in relation to the execution of the deployment engine 226, the deployment instructions 426, and/or other resource of the system 200.

In an operation 720, the signature associated with the IoT device may be propagated to neighbor edge devices. For example, the system 200 (and/or deployment engine 226, the deployment instructions 426, or other resource of the system 200) may propagate the signature associated with the IoT device to neighbor edge devices. The system 200 may propagate the signature associated with the IoT device to neighbor edge devices in a manner similar or the same as that described above in relation to the execution of the deployment engine 226, the deployment instructions 426, and/or other resource of the system 200.

The foregoing disclosure describes a number of example implementations for providing security for IoT devices. The disclosed examples may include systems, devices, computer-readable storage media, and methods for providing security for IoT devices. For purposes of explanation, certain examples are described with reference to the components illustrated in FIGS. 1-4A. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 3-4A are examples and are not intended to be limiting. Additional or fewer operations or combinations of operations may be used or may vary without departing from the scope of the disclosed examples. Furthermore, implementations consistent with the disclosed examples need not perform the sequence of operations in any particular order.

Thus, the present disclosure merely sets forth possible examples of implementations, and many variations and modifications may be made to the described examples. All such modifications and variations are intended to be included within the scope of this disclosure and protected by the following claims.

We claim:
1. A method comprising:
   receiving, at an edge device in a network, a data packet from an Internet of Things (IoT) device;
   determining, at the edge device, whether a signature associated with the IoT device exists, wherein the signature includes network layer information about the IoT device, and wherein a set of fields to include in the signature is determined using a machine learning model;
   validating the data packet using all fields of the data packet responsive to determining that the signature does not exist;
   applying, by the edge device, a set of rules to provide security for the IoT device by validating the IoT device based on the validated data packet; and
   responsive to the IoT device being validated based on the validated data packet and the applied set of rules, processing, by the edge device, the data packet from the IoT device.

2. The method of claim 1, further comprising:
   receiving, at the edge device in a network, a second data packet from the IoT device at a time interval after receiving the data packet;
   accessing, at the edge device, the signature associated with the IoT device;
   applying, by the edge device, the set of rules to validate the IoT device based on the accessed signature; and
   responsive to the IoT device being validated based on the accessed signature, received second data packet, and the applied set of rules, processing, by the edge device, the second data packet from the IoT device.

3. The method of claim 1, further comprising:
responsive to the IoT device not being validated, dropping, by the edge device, the data packet and performing remediation.

4. The method of claim 3, further wherein performing remediation comprises:
determining, by the edge device, a first remediation of a set of remediations to perform based on a signature rule that failed during validation.

5. The method of claim 1, further comprising:
responsive to the edge device not being able to parse the data packet, sending, by the edge device, the data packet to a remote parser; and
receiving, by the edge device, validation of the data packet from the remote parser.

6. The method of claim 1, further comprising:
determining, by the edge device, that the IoT device is ready to be deployed;
responsive to determining that the IoT device is ready to be deployed:
moving, by the edge device, the IoT device from a quarantine virtual local area network ("VLAN") to an enterprise VLAN; and
propagating, by the edge device, the signature associated with the IoT device to neighbor edge devices.

7. The method of claim 6, wherein the determination that the IoT device is ready to be deployed comprises:
assigning, by the edge device, the IoT device to the quarantine VLAN;
generating, by the edge device, a data sheet for the IoT device based on information from a packet of the IoT device and information about the IoT device, wherein the packet includes the network information about the IoT device; and
generating, by the edge device, the signature for the IoT device by determining information from the data sheet to include in the signature.

8. A non-transitory machine-readable storage medium comprising instructions executable by a processor of an edge device in a network, the non-transitory machine-readable storage medium comprising:
instructions to receive a data packet from an Internet of Things (IoT) device;
instructions to determine whether a signature associated with the IoT device exists wherein the signature includes network layer information about the IoT device, and wherein a set of fields to include in the signature is determined using a machine learning model;
instructions to validate the data packet using all fields of the data packet responsive to determining that the signature does not exist;
instructions to determine a set of rules to use to provide security for the IoT device by validating the IoT device based on the validated data packet; and
instructions to process the data packet from the IoT device responsive to the IoT device being validated based on the data packet and the applied set of rules.

9. The non-transitory machine-readable storage medium of claim 8, further comprising:
instructions to drop the data packet responsive to the IoT device not being validated; and
instructions to determine a first remediation of a set of remediations to perform based on a signature rule that failed during validation responsive to the IoT device not being validated.

10. The non-transitory machine-readable storage medium of claim 8, wherein the instructions to perform remediation comprise:
instructions to receive a second data packet from a second IoT device;
instructions to access a second signature associated with the second IoT device, where the second signature includes network layer information about the second IoT device;
instructions to determine a second set of rules to use to validate the second IoT device based on the accessed second signature; and
instructions to process the second data packet from the second IoT device responsive to the second IoT device being validated based on the accessed second signature, received second data packet, and the applied second set of rules.

11. The non-transitory machine-readable storage medium of claim 8, further comprising:
instructions to send the data packet to a remote parser responsive to the edge device not being able to parse the data packet; and
instructions to receive validation of the data packet from the remote parser.

12. The non-transitory machine-readable storage medium of claim 8, further comprising:
instructions to determine that the IoT device is ready to be deployed;
responsive to determining that the IoT device is ready to be deployed:
instructions to move the IoT device from a quarantine virtual local area network ("VLAN") to an enterprise VLAN; and
instructions to propagate the signature associated with the IoT device to neighbor edge devices.

13. The non-transitory machine-readable storage medium of claim 12, wherein the instructions to determine that the IoT device is ready to be deployed comprise:
instructions to assign the IoT device to the quarantine VLAN;
instructions to generate a data sheet for the IoT device based on information from a packet of the IoT device and information about the IoT device, wherein the packet includes the network information about the IoT device; and
instructions to generate the signature for the IoT device by determining information from the data sheet to include in the signature.

14. An edge device in a network, comprising:
a physical processor that implements machine readable instructions, wherein
the edge device is connected to a set of Internet of Things (IoT) devices via the network, and
the edge device is connected to a set of neighbor edge devices via the network, and
wherein the physical processor implements machine readable instructions that cause the edge device to:
receive a first data packet from a first IoT device of the set of IoT devices;
determine whether a signature associated with the first IoT device exists, wherein the signature includes network layer information about the first IoT device, and wherein a set of fields to include in the signature is determined using a machine learning model;
validate the data packet using all fields of the data packet responsive to determining that the signature does not exist;

apply a set of rules to provide security for the first IoT device by validating the first IoT device based on the validated data packet; and process the data packet from the first IoT device responsive to the first IoT device being validated based on the data packet and the applied set of rules.

15. The edge device of claim 14, wherein the physical processor implements machine readable instructions that cause the edge device to:

receive a second data packet from the IoT device at a time interval after receiving the first data packet;

access the signature associated with the IoT device;

apply the set of rules to validate the IoT device based on the accessed signature; and responsive to the IoT device being validated based on the accessed signature, received second data packet, and the applied set of rules, process the second data packet from the IoT device.

16. The edge device of claim 14, wherein the physical processor implements machine readable instructions that cause the edge device to:

responsive to the IoT device not being validated:

drop the data packet; and determine a first remediation of a set of remediations to perform based on a signature rule that failed during validation.

17. The edge device of claim 14, wherein the physical processor implements machine readable instructions that cause the edge device to:

send the data packet to a remote parser responsive to the edge device not being able to parse the data packet; and receive validation of the data packet from the remote parser.

18. The edge device of claim 14, wherein the physical processor implements machine readable instructions that cause the edge device to:

determine that the IoT device is ready to be deployed;

determining that the IoT device is ready to be deployed;

move the IoT device from a quarantine virtual local area network ("VLAN") to an enterprise VLAN; and propagate the signature associated with the IoT device to neighbor edge devices.

19. The edge device of claim 18, wherein the physical processor implements machine readable instructions that cause the edge device to determine that the IoT device is ready to be deployed by:

assigning the IoT device to the quarantine VLAN;

generating a data sheet for the IoT device based on information from a control packet of the IoT device and information about the IoT device, wherein the control packet includes the network information about the IoT device; and generating the signature for the IoT device by determining information from the data sheet to include in the signature.

* * * * *